United States Patent [19]

Tateishi

[11] Patent Number: 5,432,647
[45] Date of Patent: Jul. 11, 1995

[54] COPY PROTECTION DISK FORMAT CONTROLLER

[75] Inventor: Hisao Tateishi, Tokyo, Japan
[73] Assignee: NEC Corporation, A Corp. of Japan, Tokyo, Japan
[21] Appl. No.: 68,231
[22] Filed: May 27, 1993
[30] Foreign Application Priority Data May 27, 1992 [JP] Japan .................................. 4-134573

[51] Int. Cl.⁶ ............................................. G11B 15/04
[52] U.S. Cl. ....................................... 360/60; 360/132
[58] Field of Search ........................ 360/60, 51, 53, 32, 360/40, 49, 132, 130

[56] References Cited

U.S. PATENT DOCUMENTS

| | | | |
|---|---|---|---|
| 4,323,210 | 4/1989 | Bond | 360/60 |
| 4,534,641 | 4/1986 | Guglielmino | 360/60 X |
| 4,849,836 | 7/1989 | Kachikian | 360/60 |
| 4,858,036 | 8/1989 | Ginkel | 360/60 |
| 4,980,782 | 12/1990 | Ginkel | 360/60 |
| 5,267,311 | 11/1993 | Bakhoum | 360/60 X |

Primary Examiner—Donald Hajec
Assistant Examiner—Le Thien Minh
Attorney, Agent, or Firm—Ostrolenk, Faber, Gerb & Soffen

[57] ABSTRACT

A disk format controller for a disk drive operating on a first disk containing an original version of a program and an application-specific decoding rule where signals are recorded according to an application-specific encoding rule, and operating on a second disk containing a copy of the program and a copy of the decoding rule where signals are recorded according to a generally established format. Signals from an address specified by a host unit are transferred to the host unit via an interface so that the original version of the program and the decoding rule are installed in the host unit when the first disk is used and the copy of the program and the copy of the decoding rule are installed in the host unit when the second disk is used. In a copying mode of the host unit, the generally established format is used to control the disk drive to write the copy of the program and the copy of the decoding rule onto a third disk whose recording format is therefore identical to the format of the second disk.

14 Claims, 7 Drawing Sheets

MFM RECORDING FORMAT

| | | Sector | | | | | | |
|---|---|---|---|---|---|---|---|---|
| | | ID Field | | | | Data Field | | |
| Field | Sync | IDAM | C/H/R/N/CRC | Gap | Sync | DAM | Data | CRC |
| Data | 00 | A1A1A1FE | | 4E | 00 | A1A1A1FB | | |
| Clock | FF | 0A0A0A00 | MFM Rule | | FF | 0A0A0A00 | Original Disk: Encoded Bit Pattern | |
| | | | | | | | Copy Disk: MFM Rule | |

FIG. 5  FM RECORDING FORMAT

COPY PROTECTION DISK FORMAT CONTROLLER

BACKGROUND OF THE INVENTION

1. Field of the Invention

The present invention relates generally to disk format controllers for the frequency modulation/modified frequency modulation (FM/MFM) recording format as employed in MS-DOS operating systems and the group code recording (GCR) format as employed in systems developed by Apple Computer, Inc. More specifically, the present invention is concerned with a copy protection technique for preventing unauthorized copying of original software products.

2. Description of the Related Art

Since recordings on disks, either magnetic or optical, are made as a bit serial stream on a single track, special provision is made to allow the reading system to maintain synchronization. This is achieved by the encoding format, which either includes clock pulses or encodes the data in such a way that there cannot be a case where there is an excess number of no transition states, or 0s. In FM/MFM recording, a clock pulse is used to represent a transition and in a GCR format a data stream is encoded by breaking it into groups of four bits and mapping these onto five bit groups. Due to the resultant redundancy, the five bit groups are selected to limit the number of consecutive 0s to control the maximum spacing between transitions.

Since the recorded clock pulses are used exclusively to maintain synchronization, the current disk format controller of the MS-DOS system exclusively outputs data pulses to the host system, where the original application program can be illegally copied. In the GCR format system, data pulses read from a disk are decoded by the disk format controller according to the GCR decoding rule before transferred to the host system, where illegal copying may occur.

To prevent the unauthorized duplication of original software products, attempts were made by software developers. These include changing the cyclic redundant check (CRC) sequence of a program recorded in FM/MFM format so that the MS-DOS system cannot easily duplicate the program, or changing the check sum bytes of a program in GCR format into a special format so that the program cannot easily be duplicated by the Macintosh Operating System developed by Apple Computer, Inc.

SUMMARY OF THE INVENTION

It is therefore an object of the present invention to prevent unauthorized duplication of an original disk by encoding clock pulses in the case of FM/MFM recording format or data pulses in the case of GCR format according to an application-specific encoding rule and decoding the encoded clock or data pulses according to an application-specific decoding rule installed from the original disk.

According to a first, broader aspect of the present invention, there is provided an apparatus which comprises a disk drive operating on a first disk containing an original version of a program and an application-specific decoding rule where signals are recorded according to an application-specific encoding rule, and operating on a second disk containing a copy of the program and a copy of the application-specific decoding rule where signals are recorded according to a generally established format. A controller is provided for reading signals from an address specified by a host unit and transferring the signals to the host unit so that the original version of the program and the application-specific decoding rule are installed in the host unit when the first disk is used and the copy of the program and the copy of the decoding rule are installed in the host unit when the second disk is used, whereby the host unit can verify the authenticity of the first and second disks depending on contents of the decoded signals. The controller further controls the disk drive to write the copy of the program and the copy of the decoding rule onto a third disk according to the generally established format when the host unit is in a copying mode.

According to a second, specific aspect of the present invention, there is provided an apparatus for a host unit capable of decoding clock bits according to an application-specific decoding rule and verifying the decoded clock bits. The apparatus includes a disk drive for providing a read operation on a first recording disk which contains data bits representing an original version of an application program and the decoding rule and clock bits, the clock bits of the first recording disk being recorded according to an application-specific encoding rule, and a read operation on a second recording disk which contains data bits representing a copy of the application program and a copy of the decoding rule and clock bits, the clock bits of the second recording disk being recorded according to a modified frequency modulation/frequency modulation (MFM/FM) recording format. Register means are provided for storing data bits and clock bits from the disk drive. A controller is connected to the register means and the host unit via an interface for receiving an instruction from the host unit for transferring data bits and clock bits form the register means to the host unit when the data bits and the clock bits are read from an address of either of the disks specified by the instruction so that the original version of the application program and the decoding rule are installed in the host unit when the first recording disk is used or the copy of the application program and the copy of the decoding rule are installed in the host unit when the second recording disk is used. Therefore, the host unit can validate the original version of the application program if the transferred clock bits are successfully decoded by the installed decoding rule or invalidate the copy of the application program if the transferred clock bits are not successfully decoded by the installed copy of the decoding rule. The controller further controls the disk drive to write the copy of the application program and the copy of decoding rule onto a third recording disk and to write clock bits onto the third disk according to the MFM/FM recording format.

According to a third, specific aspect of the invention, an apparatus is provided for a host unit capable of decoding data bits according to an application-specific decoding rule and verifying the decoded data bits. The apparatus includes a disk drive for providing a read operation on a first recording disk which contains data bits representing an original version of an application program and the decoding rule, the original version of the application program being recorded according to an application-specific encoding rule, and the decoding rule being recorded according to a group code recording (GCR) format, and a read operation on a second recording disk which contains data bits representing a copy of the application program and a copy of the decoding rule, both of the copies being recorded according to the GCR format. Register means is provided for storing data bits from the disk drive. A controller is connected to the register means and the host unit via an interface for receiving an instruction from the host unit for transferring data bits from the register means to the host unit when the data bits are read from an address of either of the disks specified by the instruction so that the original version of the application program and the decoding rule are installed in the host unit when the first recording disk is used and the copy of the application program and the copy of the decoding rule are installed in the host unit when the first recording disk is used. Therefore, the host unit can validate the original version of the application program if the transferred data bits are successfully decoded by the installed decoding rule and invalidate the copy of the application program if the transferred data bits are not successfully decoded by the installed copy of the decoding rule. The controller further controls the disk drive to write the copy of the application program and the copy of decoding rule onto a third recording disk according to the GCR format.

According to a fourth, specific aspect, the present invention provides a disk format controller for an apparatus including a host unit for decoding clock bits according to an application specific decoding rule and verifying the decoded clock bits, and a disk drive for providing a read operation on a first recording disk which contains data bits representing an original version of an application program and the decoding rule and clock bits, the clock bits of the first recording disk being recorded according to an application-specific encoding rule, and a read operation on a second recording disk which contains data bits representing a copy of the application program and a copy of the decoding rule and clock bits, the clock bits of the second recording disk being recorded according to a MFM/FM recording format. The disk format controller comprises register means for storing data bits and clock bits from the disk drive, an interface adapted for connection to the host unit, and a controller connected to the register means and the interface for receiving an instruction from the host unit for transferring data bits and clock bits from the register means to the host unit when the data bits and the clock bits are read from an address of either of the disks specified by the instruction so that the original version of the application program and the decoding rule are installed in the host unit when the first recording disk is used and the copy of the application program and the copy of the decoding rule are installed in the host unit when the second recording disk is used, and for controlling the disk drive to write the copy of the application program and the copy of decoding rule onto a third recording disk and clock bits, the clock bits of the third recording disk being recorded according to the MFM/FM recording format.

According to a fifth, specific aspect, the present invention provides a disk format controller for an apparatus including a host unit for decoding data bits according to an application-specific decoding rule and verifying the decoded data bits, and a disk drive for providing a read operation on a first recording disk which contains data bits representing an original version of an application program and the decoding rule, the original version of the application program being recorded according to an application-specific encoding rule, and the decoding rule being recorded according to a GCR format, and a read operation on a second recording disk which contains data bits representing a copy of the application program and a copy of the decoding rule, both of the copies being recorded according to the GCR format. The disk format controller comprises register means for storing data bits from the disk drive, an interface adapted for connection to the host unit, and a controller connected to the register means and the interface for receiving an instruction from the host unit for transferring data bits from the register means to the host unit when the data bits are read from an address of either of the disks specified by the instruction so that the original version of the application program and the decoding rule are installed in the host unit when the first recording disk is used and the copy of the application program and the copy of the decoding rule are installed in the host unit when the second recording disk is used, and for controlling the disk drive to write the copy of the application program and the copy of decoding rule onto a third recording disk according to the GCR format.

According to a sixth, specific aspect, the present invention provides a method of protection from illegal copy of an original disk. The protection method comprises providing a read operation on a first recording disk which contains data bits representing an original version of an application program and a decoding rule and clock bits, the clock bits of the first recording disk being recorded according to an application-specific encoding rule, or a read operation on a second recording disk which contains data bits representing a copy of the application program and a copy of the decoding rule and clock bits, the clock bits of the second recording disk being recorded according to an MFM/FM recording format. Data bits and clock bits are read from the disk drive so that the original version of the application program and the decoding rule are installed in a host unit when the first recording disk is used or the copy of the application program and the copy of the decoding rule are installed in the host unit when the second recording disk is used. The clock bits are decoded according to the decoding rule installed when the first recording disk is used or according to the copy of the decoding rule when the second recording disk is used. The decoded clock bits are verified and the original version of the application program is validated if the clock bits are successfully decoded or the copy of the application program is invalidated if the clock bits are not successfully decoded.

According to a seventh, specific aspect, the present invention provides a method of protection from illegal copy of an original disk. The protection method comprises providing a read operation on a first recording disk which contains data bits representing an original version of an application program and a decoding rule, the application program of the first recording disk being recorded according to an application-specific encoding rule and the decoding rule of the first recording disk being recorded according to a GCR format or a read operation on a second recording disk which contains data bits representing a copy of the application program and a copy of the decoding rule, both of the copies being recorded according to the GCR format. Data bits are read from the disk drive so that the original version of the application program and the decoding rule are installed in a host unit when the first recording disk is used or the copy of the application program and the copy of the decoding rule are installed in the host unit when the second recording disk is used. The data bits are decoded according to the installed decoding rule when the first recording disk is used or according to the installed copy of the decoding rule when the second recording disk is used. The decoded data bits are verified and the original version of the application program is validated if the data bits are successfully decoded or the copy of the application program is invalidated if the data bits are not successfully decoded.

BRIEF DESCRIPTION OF THE DRAWINGS

The present invention will be described in further detail with reference to the accompanying drawings, in which.

DETAILED DESCRIPTION

Figure 1:
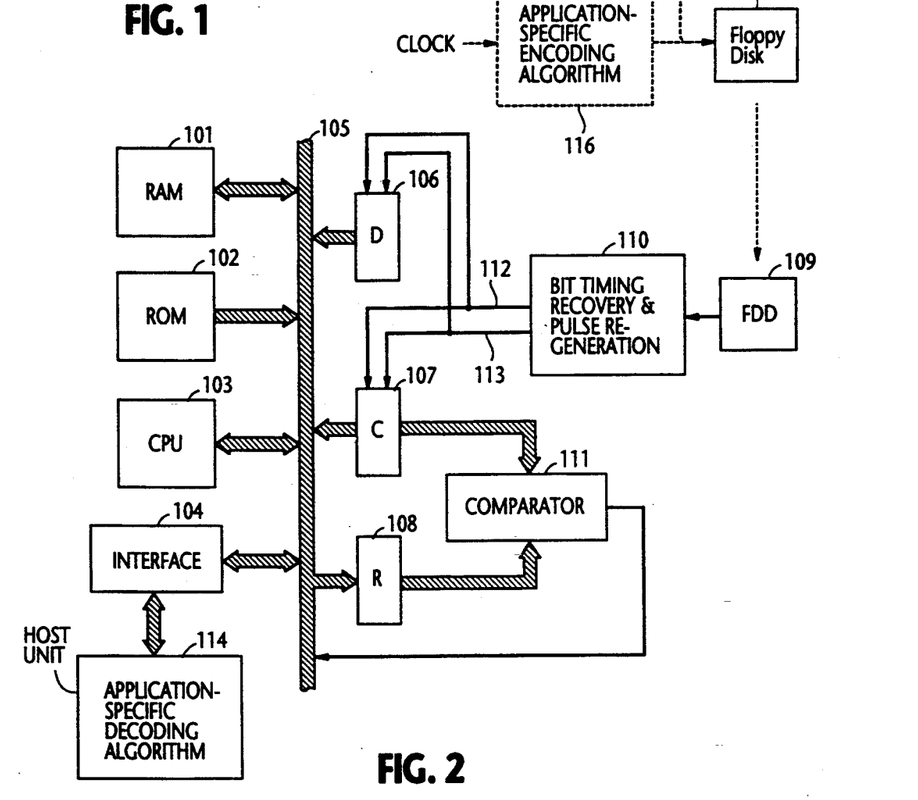
FIG. 1 is a block diagram of a floppy disk format controller according to one embodiment of the present invention.

Referring now to FIG. 1, there is shown an essential part of a floppy disk format controller (FDC) according to one embodiment of the present invention. As shown, the FDC is comprised by a central processing unit 103 that provides overall control of the FDC, an interface 104 for interfacing the FDC to a host unit 114 such as workstation or personal computer, a random access memory 101 for storing data and clock signals processed by CPU 103, and a read-only memory 102 in which the operating program of the CPU is stored. All of these units are coupled to a common bus 105.

A bit timing recovery and pulse regeneration unit 110 is provided for receiving a signal read sequentially from the floppy disk drive 109 and provides pulse regeneration and recovery of a bit timing signal that is synchronized to the data and clock bits of the sequential signal. The sequential signal and the sync timing signal are applied on lines 112 and 113, respectively, to a data (D) register 106 and a clock (C) register 107 that are connected to bus 105. The D register 106 extracts and stores one byte of data bits from the sequential signal by using the sync signal on line 112 and the C register 107 extracts and stores one byte of clock bits from sequential signal using the sync signal. A reference (R) register 108 is connected to bus 105 to store a reference byte supplied from the CPU 103. The reference byte in the C register 107 is compared with a byte stored in the R register 108 by a comparator 111 that produces a 1 when they match between them and a 0 if they mismatch. The output of comparator 111 is supplied to CPU 103 via bus 105.

According to the MFM recording format, one byte of original data bits $D_i$, (where i=0 to 7) is converted to two bytes of composite signal by alternately interleaving clock ($C_i$) bits and data ($D_i$) bits. These clock bits are generated according to the formula $C_n$—(Inverted $D_{n-1}$)×(Inverted $D_n$) so that if original one byte data is "A1" it is converted to two-byte data "44A9".

There is shown an original floppy disk 115 which is prepared by a software developer (i.e., the supplier of the floppy disk) according to an application-specific encoding algorithm 116 with which clock bits are encoded and interleaved with data bits (application program such as word processing software). The floppy disk drive 109 is adapted to receive such floppy disks as well as those disks formatted according to the conventional modified frequency modulation (MFM) recording technique.

Figure 2:
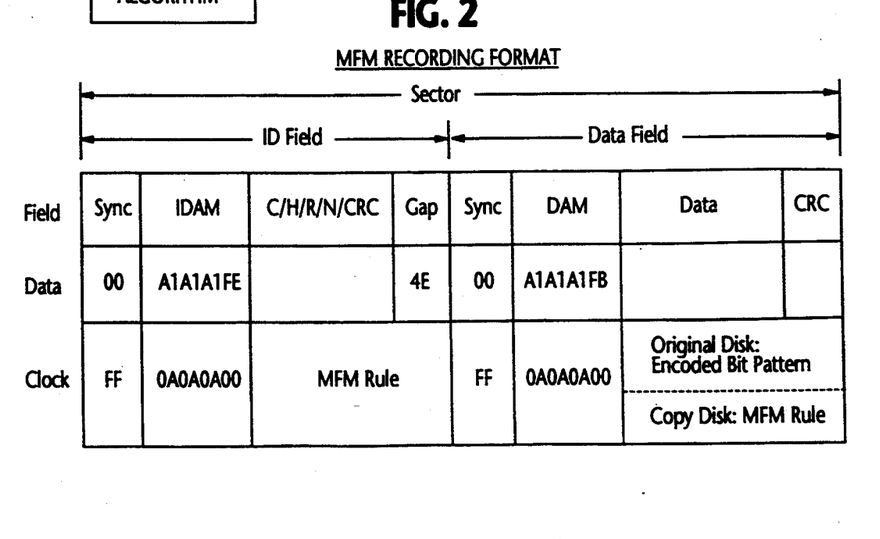
FIG. 2 is a recording format according to the MFM (modified frequency modulation) recording technique.

FIG. 2 illustrates the recording format of the original floppy disk and the conventional MFM formatted floppy disk. Each sector of these floppy disks is partitioned into an identification (ID) field and a data field, each field comprising a data bit pattern (upper row) and a clock bit pattern (lower row). The data bit pattern of the ID field comprises a sync code (-"00" in hexadecimal notation), an address mark "A1A1A1FB", a series of cylinder number (C), head number (H), sector number (R) and sector length (N) and a CRC (cyclic redundant check) sequence, and a gap code "4E". The data bit pattern of the data field contains a sync code "00", an address mark "A1A1A1FB", information data bits and a CRC sequence. The clock bit pattern contains, in its ID field, a sync code "FF", and an address mark "0A0A0A00" and a clock pattern according to the MFM rule, and contains, in its data field, a sync "FF", an address mark "0A0A0A00" and a clock pattern which varies depending on whether the disk is original or copy. If the floppy disk is the original, the clock bits following the address mark "0A0A0A00" have a unique bit pattern resulting from the application-specific encoding process developed by the supplier of the application program, and if it is a copy disk they exhibits a pattern according to the MFM rule.

The D register 106 stores one-byte of data bits $D_i$ for transfer to the host interface 104 and the C register 107 stores one-byte of clock bits $C_i$ for transfer to the comparator 111 and the interface 104 following the data byte.

The readout operation of the floppy disk format controller on either of the original or copy disk is performed by the CPU 103 according to the operating program stored in the ROM 102. This program is illustrated in a flowchart of FIG. 3 with reference to which the readout operation is described. In this embodiment, the ROM 102 further stores a program for recording data and clock bytes according to the MFM format.

Figure 3:
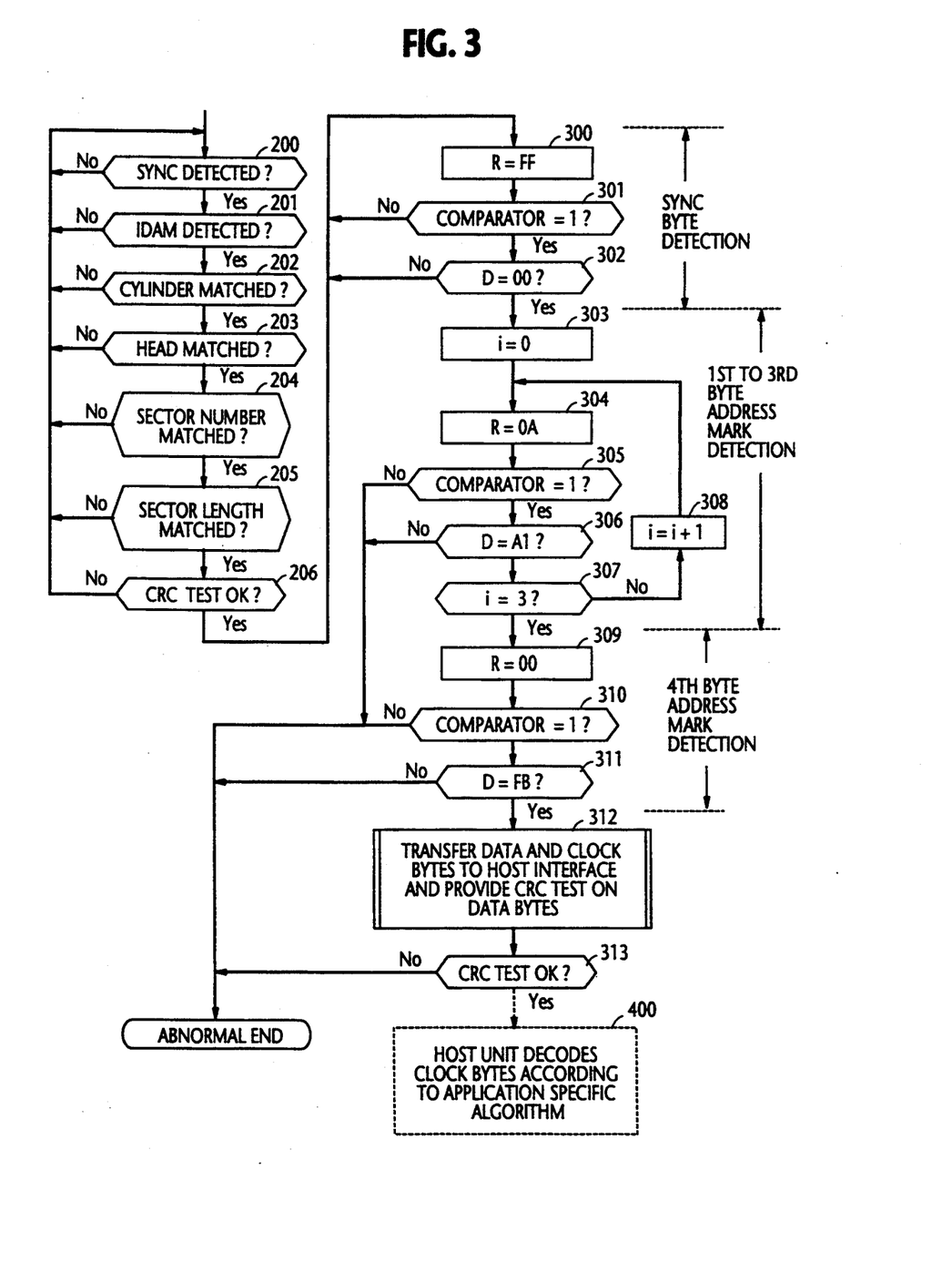
FIG. 3 is a flowchart describing the operation of the FDC when reading a floppy disk on which data is recorded according to the MFM recording format of FIG. 2.

One of the sectors of the floppy disk 115 is specified by the host unit 114 and the ID field of a sector is read into the D register 106. The CPU 103 checks the contents of the D register with each of two-byte codes supplied from the host unit 114. These codes include the sync byte "00" (step 201), the address mark "A1A-1A1FB" (step 201), the cylinder number (step 202), the head number (step 203), the sector number (step 204), the sector length (step 205), and performs a CRC test on the data bits of the ID field (step 206). If any of these decision steps 200 through 206 detects a mismatch or incorrect data, control returns to the beginning of step 200 to repeat the process on successive data bytes. Otherwise, control proceeds to data field detection routine which involves detection of the sync byte, and the first, second, third and fourth address marks. The data field detection routine begins with step 300 in which control writes the clock sync byte "FF" into the R register 108. Comparator 111 compares it with clock bits stored into the C register 107 (step 301) and if they match comparator 111 produces a logic-1 output. In response, control branches at step 301 to step 302 to check to see if the contents of the D register are equal to the data sync byte "00". If negative decision is given by step 301 or 302, control repeats steps 300, 301 and 302 on subsequent data and clock bytes.

If the decision at step 302 is affirmative, control recognizes that sync detections for both data and clock bytes are successful, and exits to step 303 to reset a variable 1 to zero. In step 304, the first byte "0A" of clock clock address mark "0A0A0A00" is written into the R register and, in step 305, comparator 111 checks the contents of the C register against the contents of the R register to detect a match or mismatch. If they match, control proceeds to step 306 to check to see if the D register is set equal to the first byte "A1" of data address mark "A1A1A1FB". If step 306 gives an affirmative decision, variable i is checked in step 307 to see if it is equal to 3. If not, control branches to step 308 to increment the variable i by one and returns to step 304 to repeat the process until it becomes equal to 3. When i=3, control exits to step 309 to write the fourth byte "00" of the clock address mark into the R register, which is then compared with the contents of the C register (step 310). If they match, control checks to see if the content of the D register is set equal to the fourth byte "FB" of the data address mark (step 311). If a negative decision is given by steps 305, 306, 310 and 311, control terminates the execution of the program as an abnormal end and gives an appropriate indication.

If the decision of step 311 is affirmative, control proceeds to step 312 to transfer both of subsequently generated data and clock bytes from the D and C registers, respectively, to the host unit via interface 104, while at the same time performing a cyclic redundant check on the data bits using a CRC sequence contained in the data field. Control then proceeds to step 313 to determine if the CRC test gives a negative or affirmative decision. If negative, control terminates the program as an abnormal end. Otherwise, control allows the host unit 114 to decode the clock bytes, as shown in broken-line block 400, according to the application-specific decoding program loaded into the host unit from the floppy disk.

Figure 4A:
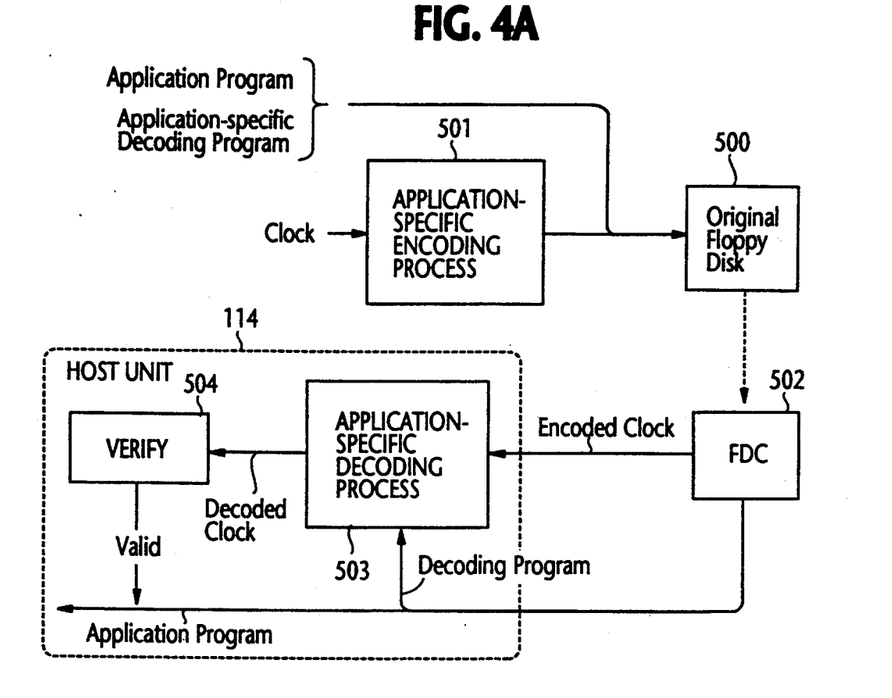
FIGS. 4A and 4B are schematic block diagrams illustrating read operations for authentic and illegal floppy disks, respectively, of the MFM/FM format.

As illustrated schematically in FIG. 4A, an original, authentic floppy disk 500 is prepared by encoding clock bits through an application-specific encoding process 501 and data bits representing the application program (such as word processing program) and an application-specific decoding program are interleaved with the encoded clock bits according to the MFM recording format and writing the interleaved data and clock bits onto the floppy disk 500. With the floppy disk 500 being loaded into a floppy disk format controller 502 according to the present invention, the encoded clock bytes are separated from the data bytes and supplied to an application-specific decoding process 503 of the host unit 114 and the data bytes representing the decoding program are also supplied to the decoding process 503 where it is used to decode the encoded clock bytes.

The host unit 114 is able to determine the authenticity of the floppy disk 500 by examining the result of the decoding process. If the clock bytes are successfully decoded as intended by the software developer of the application program, a verification process 504 determines that the floppy disk 500 is original and authentic and treats the application program as valid data. Otherwise, it determines that the floppy disk is one that contains an application program which was illegally copied, and proceeds to treat the application program as invalid data.

Figure 4B:
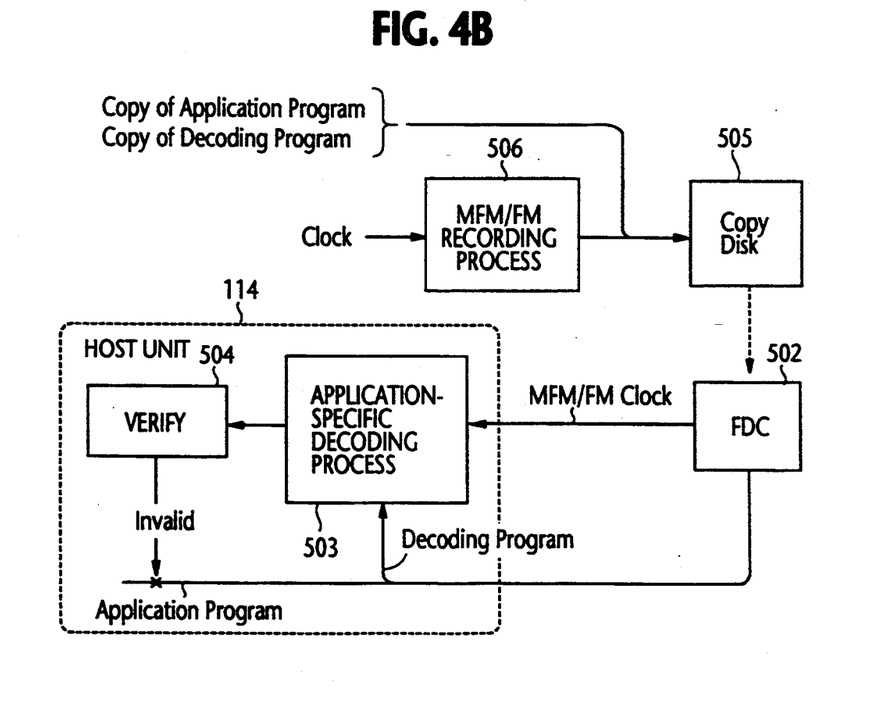

If an attempt is made by an unauthorized user to duplicate the contents of the original disk 500 onto a copy disk 505 (FIG. 4B), the clock bytes in the data field of each sector for the disk 505 are recorded through an MFM recording process 506 using the MFM format control program in ROM 102 and bit-interleaved with data bytes representing a copy of the application program and a copy of the decoding program are written onto the copy disk 505. On reading such a disk by the FDC 502, the MFM-formatted clock bytes are applied to decoding process 503 to which the copy of decoding program is installed to decode the clock bytes. The result of the decoding process, as verified by process 504, is a bit pattern which is far from what is intended by the software developer. Since the clock bits contained in the data field are as long as data bits and since different encoding patterns can be employed respectively on different sectors, the number of encoding patterns that can be used for a floppy disk would become astronomical. It is thus impossible for an unauthorized attempt to estimate the encoding algorithm for decoding the clock signal.

Figure 5:
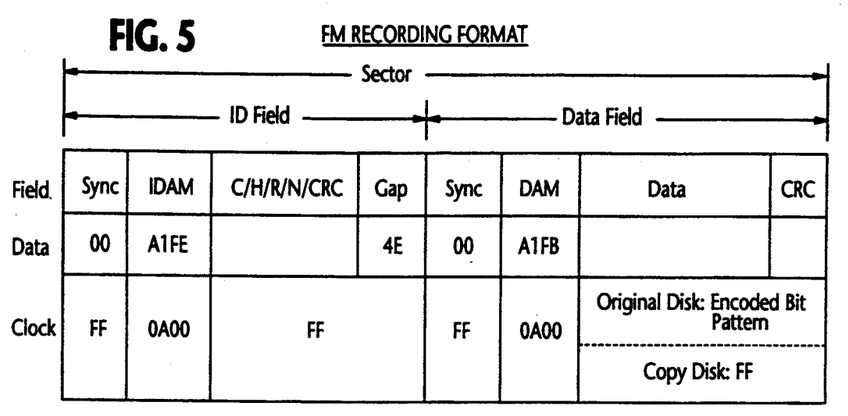
FIG. 5 is a recording format according to the FM (frequency modulation) recording technique.
Figure 6:
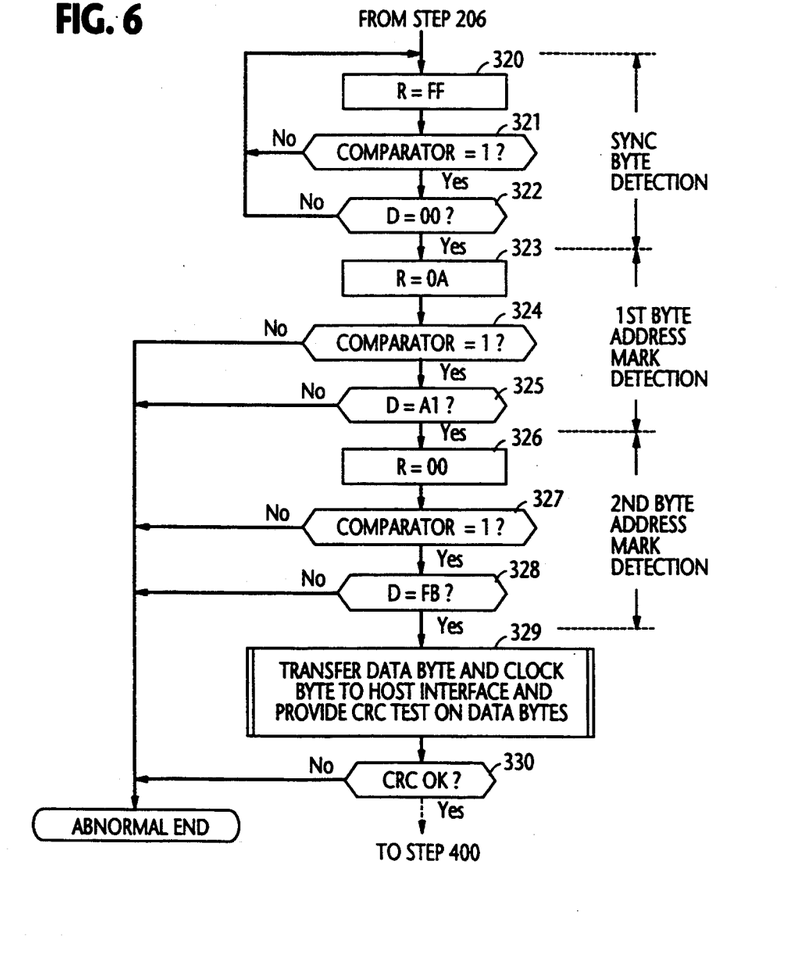
FIG. 6 is a flowchart describing the operation of the FDC when reading a floppy disk on which data is recorded according to the FM recording format of FIG. 5.

If the application program is recorded in the frequency modulation (FM) format, the format of this recording is shown in FIG. 5 and the operating program of ROM 102 is modified as shown in FIG. 6. In FIG. 5, the FM recording format differs from the MFM recording format in that both data and clock address marks of both fields are the last two bytes of those of the MFM format and clock bits are recorded as a repetition of byte "FF" instead of the MFM rule. Therefore, if the original data bits are represented by $D_7$, $D_6$, $D_5$, $D_4$, $D_3$, $D_2$, $D_1$, $D_0$, the bit interleaving results in a two-byte composite signal represented by $D_7$, $C_7$, $D_6$, $C_6$, $D_5$, $C_5$, $D_4$, $C_4$, $D_3$, $C_3$, $D_2$, $C_2$, $D_1$, $C_1$, $D_0$, $C_0$ (where $C_7$ through $C_0$ represent the encoded clock bit pattern) if the disk is authentic, or represented by $D_7$, 1, $D_6$, 1, $D_5$, 1, $D_4$, 1, $D_3$, 1, $D_2$, 1, $D_1$, 1, $D_0$, 1 if it is a copy disk. In this modification, the ROM 102 stores a program for recording data and clock bytes according to the FM format.

In FIG. 6, the ID field detection sequence is identical to that of FIG. 3, and hence its description is omitted for simplicity. The data field detection sequence starts with step 320 following step 206 of FIG. 3. In step 320, the R register is set to "FF" which is checked with the contents of the C register by comparator 111 (step 321). If they match, step 322 is executed to determine whether "00" is written into the D register. If the answer is affirmative, control proceeds to step 323 to write "0A"

into the R register, which is checked against the contents of the C register (step 324). The contents of the D register are checked to see if it is set equal to "A1" (step 325). If the answer is affirmative, the first byte of both address marks is successfully detected, and a similar process is repeated by steps 326, 327 and 328 for detecting a clock byte "00" (step 326) and a data byte "FB" (step 328) of the second byte address marks. If an affirmative decision is given by step 328, control proceeds to step 329 to transfer both of subsequently generated data and clock bytes from the D and C register, respectively, to the host unit via interface 104, while at the same time performing a cyclic redundant check on the data bits using a CRC sequence contained in the data field. Control then proceeds to step 330 to determine if the CRC test gives a negative or affirmative decision. If negative, control terminates the program as an abnormal end, and otherwise, it allows the host unit 114 to decode the clock bytes according to the application-specific decoding algorithm of the host system to determine the authenticity of the floppy disk.

The present invention can be used for floppy disks formatted according to the group code recording (GCR) recording scheme.

Figure 7:
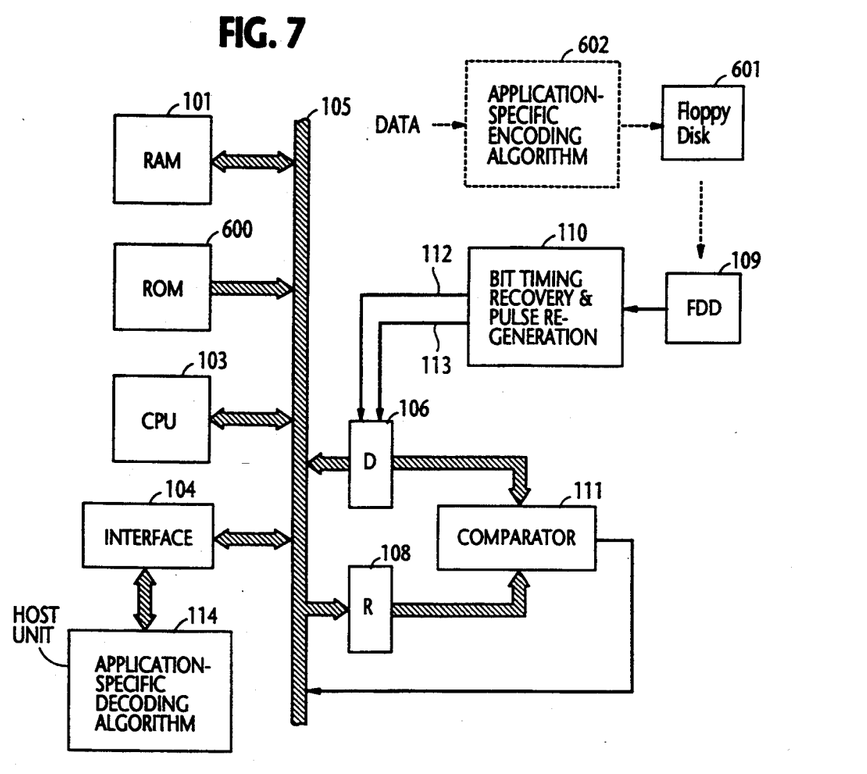
FIG. 7 is a block diagram of a floppy disk format controller according to a modified embodiment of the present invention.
Figure 8:
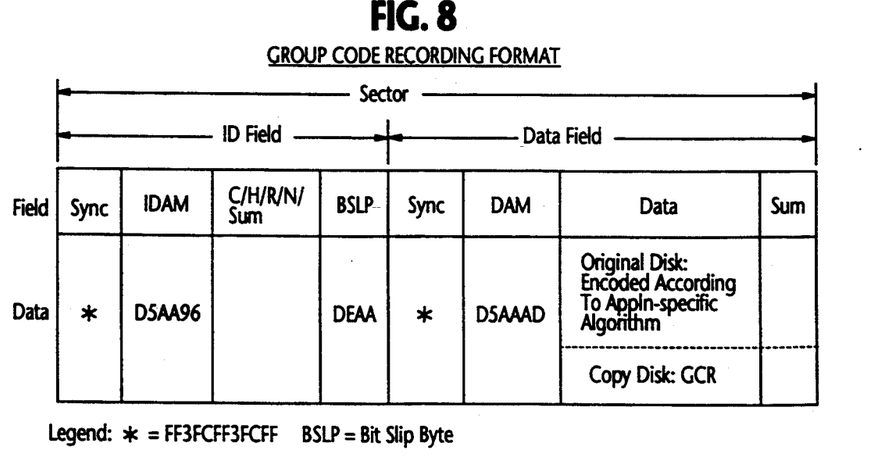
FIG. 8 is a recording format according to the group code recording technique (GCR)

FIG. 7 is a block diagram of the GCR formatted floppy disk format controller according to a modified embodiment of the present invention. The hardware of the FDC of this embodiment is similar to that of FIG. 1 except that it uses a ROM 600 that stores an operating program shown in FIG. 9 as well as a program for recording data according to the GCR format and the C register of the previous embodiment is replaced with the D register since the GCR recording format contains no clock signal as shown in FIG. 8. In the modified embodiment, the data on the floppy disk 601 has undergone an application-specific encoding process 602 developed by the supplier of the floppy disk. If the disk 601 is authentic, the data bytes in the data field of each sector of the disk is the unique bit pattern of the application-specific encoding algorithm, otherwise, they are in the GCR format as shown in FIG. 8. Details of encoding and decoding processes according to the GCR format are disclosed in U.S. Pat. No. 4,564,941.

Figure 9:
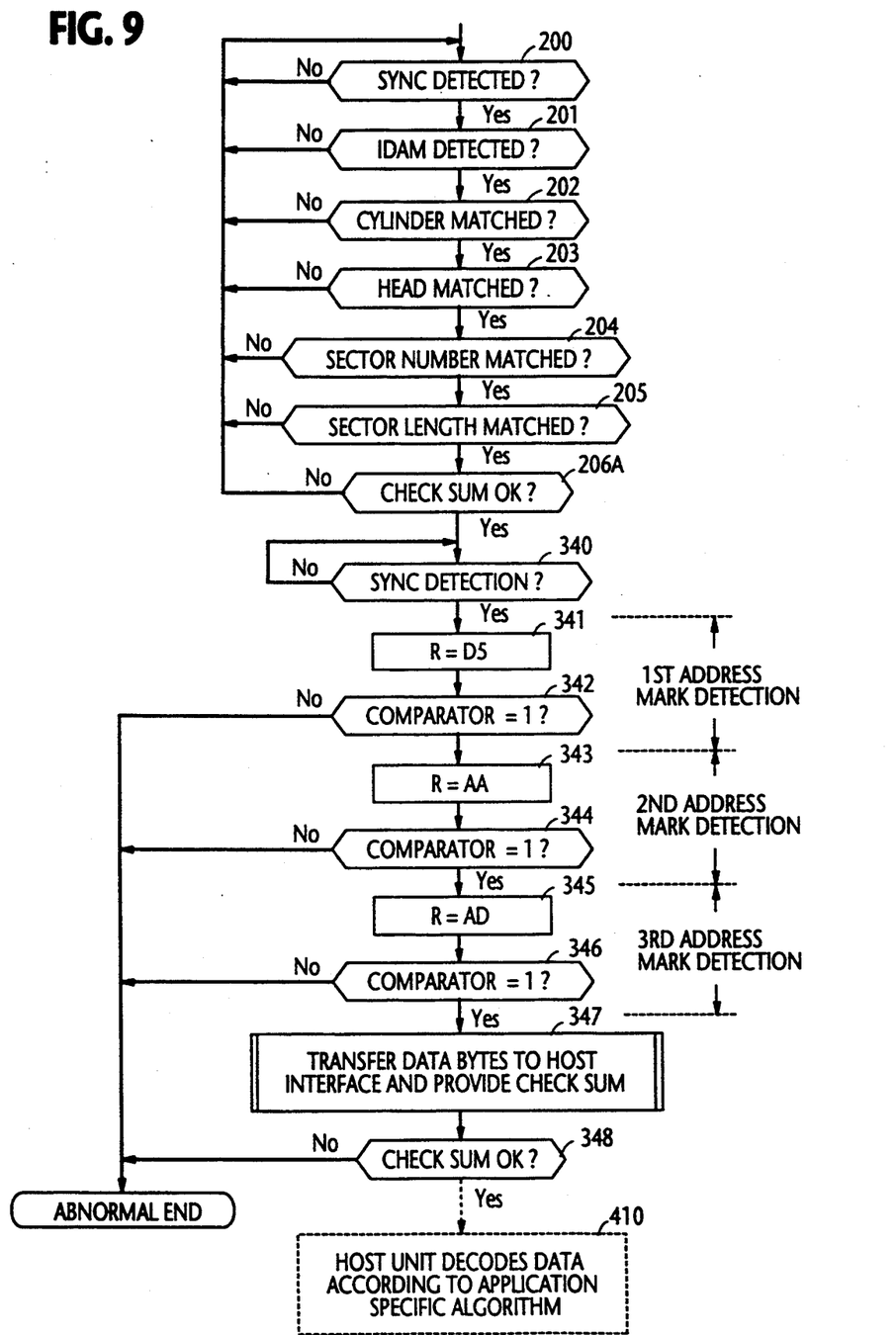
FIG. 9 is a flowchart describing the operation of the FDC when reading a floppy disk whose format is in accordance with the GCR format of FIG. 8.

In FIG. 9, the ID field detection sequence of a desired sector is represented by steps 200 to 206A substantially the same as those in FIG. 3 with the exception that step 206A provides a check sum, instead of the CRC sequence of the MFM or FM recording format.

A data field detection sequence begins with sync detection step 340 that detects the sync code of the data field as indicated in FIG. 8. In step 341, a first byte "D5" is written into the R register for comparison with the contents of the D register (step 342). In subsequent steps 343 through 346, codes "AA" and "AD" are successively written into the R register for comparison with successive contents of the D register to detect matches for the detection of the second and third address marks. If the decision of step 346 is affirmative, data bytes that are subsequently supplied from the data field are transferred to the host interface 104 while providing a check sum on them using a check sum sequence that follows (step 347). If the check sum reveals that the data bytes are valid (step 348), control allows the host unit to decode them according to an application-specific decoding algorithm (step 410). If any of steps 342, 344, 346 and 348 yields a negative decision, control terminates the program as an abnormal end.

Figure 10A:
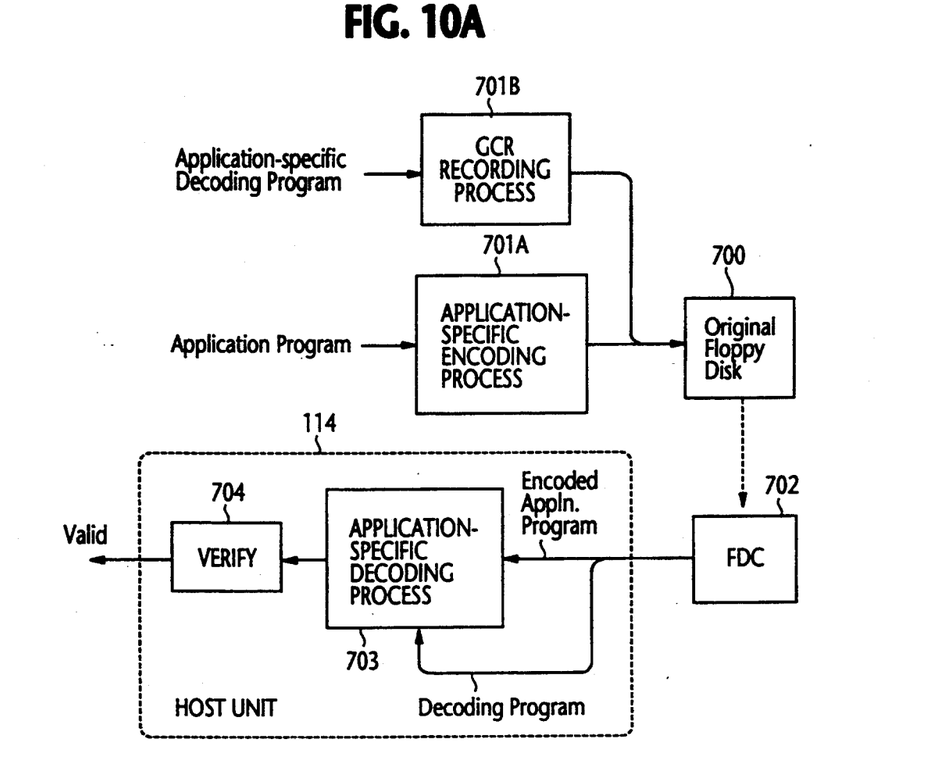
FIGS. 10A and 10B are schematic block diagrams illustrating read operations for authentic and illegal floppy disks, respectively, of the GCR format.

As illustrated in FIG. 10A, an authentic floppy disk 700 is prepared by first encoding data bytes representing an application program through an application-specific encoding process 701A. An application-specific decoding program data are encoded according to the GCR format by a process 701B. The specifically encoded application program data and the GCR-formatted application-specific decoding program data are recorded on the floppy disk 700. With the floppy disk 700 being installed on the floppy disk format controller 702 of the present invention, the encoded application program data are supplied to an application-specific decoding process 703 of the host unit 114 and the decoding program is also supplied to decoding process 703 where it is used to decode the encoded data. In a manner similar to the previous embodiments, the host unit 114 determines the authenticity of the floppy disk 700 by examining the result of the decoding process. If the application program data is successfully decoded, a verification process 704 determines that the floppy disk 700 is original and authentic and treats the application program as valid data. Otherwise, it determines that the floppy disk is illegal, and proceeds to treat the application program as invalid data.

Figure 10B:
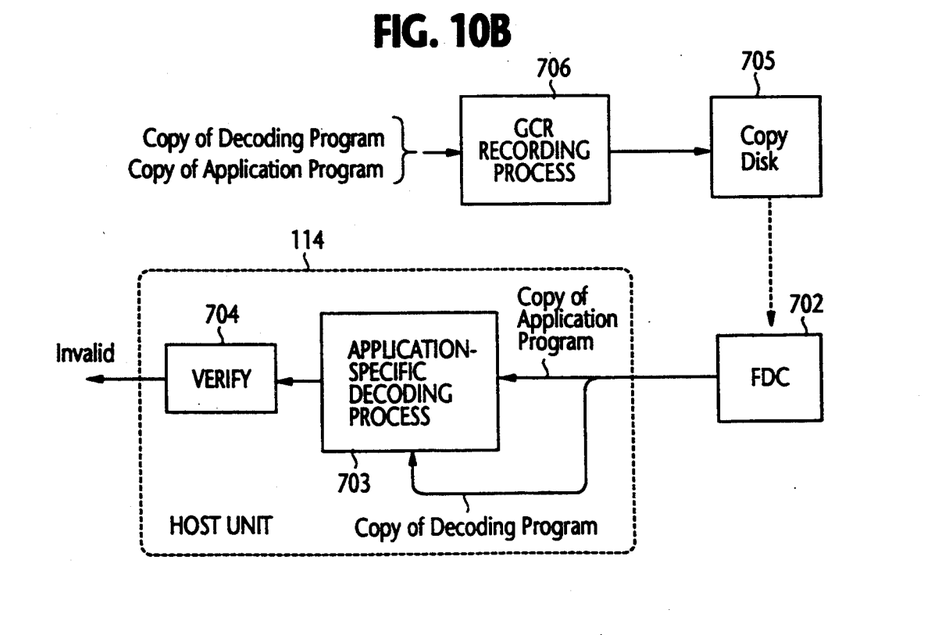

If an attempt is made by an unauthorized user to duplicate the contents of the original disk 700 onto a copy disk 705 (FIG. 10B), a copy of the application program and a copy of the decoding program are recorded through a GCR recording process 706 using the GCR format control program in ROM 600 in the data field of a respective sector on disk 705. On reading such a disk by the FDC 702, the GCR-formatted data bytes are applied to decoding process 703 to which the copy of decoding program is installed. The result of the decoding process is verified by process 704 to indicate that the application program is invalid.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus comprising:
   a disk drive for providing a read operation on a first recording disk which contains data bits representing an original version of an application program and a decoding rule which are recorded according to a modified frequency modulation/frequency modulation (MFM/FM) recording format and clock bits recorded according to an application-specific encoding rule, said disk drive including means for writing data bits representing a copy of said application program and a copy of said decoding rule according to the MFM/FM recording format and clock bits according to the MFM/FM recording format, and providing a read operation on the data bits and the clock bits of the second recording disk;
   register means for storing data bits and clock bits from said disk drive;
   an interface adapted for connection to a host unit; and
   control means connected to said register means and said interface for receiving an instruction from the host unit for transferring data bits and clock bits from said host unit when said data bits and said clock bits are read from an address of either of said disks specified by said instruction so that the original version of the application program and said decoding rule are installed in said host unit when said first recording disk is used and said copy of the application program and said copy of the decoding rule are installed in said host unit when said second recording disk is used, whereby said host unit can validate said original version of the application program if the transferred clock bits are successfully decoded by the installed decoding rule and invalidate said copy of the application program if the transferred clock bits are not successfully decoded by the installed copy of the decoding rule.

2. An apparatus comprising:

a disk drive for providing a read operation on a first recording disk which contains data bits representing an original version of an application program and a decoding rule, the original version of the application program being recorded according to an application-specific encoding rule, and said decoding rule being recorded according to a group code recording (GCR) format, said disk drive including means for writing data bits representing a copy of said application program and a copy of said decoding rule according to the GCR format on a second recording disk and providing a read operation on the data bits of the second recording disk;

register means for storing data bits from said disk drive;

an interface adapted for connection to a host unit; and control means connected to said register means and said interface for receiving an instruction from the host unit for transferring data bits from said register means to said host unit when said data bits are read from an address of either of said disks specified by said instruction so that the original version of the application program and said decoding rule are installed in said host unit when said first recording disk is used and said copy of the application program and said copy of the decoding rule are installed in said host unit when said second recording disk is used, whereby said host unit can validate said original version of the application program if the transferred data bits are successfully decoded by the installed decoding rule and invalidate said copy of the application program if the transferred data bits are not successfully decoded by the installed copy of the decoding rule.

3. In an apparatus comprising a host unit for decoding clock bits according to an application-specific decoding rule and verifying the decoded clock bits, and a disk drive for operating on a first recording disk which contains data bits representing an original version of an application program and said decoding rule and clock bits, the clock bits of the first recording disk being recorded according to an application-specific encoding rule, a disk format controller comprising:

means for controlling said disk drive to write data bits representing a copy of said application program and a copy of said decoding rule and clock bits on a second recording disk according to a modified frequency modulation/frequency modulation (MFM/FM) recording format and to read the data bits and the clock bits from the first and second recording disks;

register means for storing data bits and clock bits from said disk drive;

an interface adapted for connection to said host unit; and control means connected to said register means and said interface for receiving an instruction from the host unit for transferring data bits and clock bits from said register means to said host unit when said data bits and said clock bits are read from an address of either of said disks specified by said instruction so that the original version of the application program and said decoding rule are installed in said host unit when said first recording disk is used and said copy of the application program and said copy of the decoding rule are installed in said host unit when said second recording disk is used.

4. In an apparatus comprising a host unit for decoding data bits according to an application-specific decoding rule and verifying the decoded data bits, and a disk drive for operating on a first recording disk which contains data bits representing an original version of an application and said decoding rule, the original version of the application program being recorded according to an application-specific encoding rule, and said decoding rule being recorded according to a group code recording (GCR) format, a disk format controller comprising:

means for controlling said disk drive to write data bits representing a copy of said application program and a copy of said decoding rule on a second recording disk according to a group code recording (GCR) format and to read the data bits from the first and second recording disks;

register means for storing data bits from said disk drive;

an interface adapted for connection to said host unit; and control means connected to said register means and said interface for receiving an instruction from the host unit for transferring data bits are read from an address of either of said disks specified by said instruction so that the original version of the application program and said decoding rule are installed in said host unit when said first recording disk is used and said copy of the application program and said copy of the decoding rule are installed in said host unit when said second recording disk is used.

5. A method of protection from illegal copy of an original disk, comprising the steps of:

a) providing a read operation on a first recording disk which contains data bits representing an original version of an application program and a decoding rule and clock bits, the clock bits of the first recording disk being recorded according to an application-specific encoding rule, or a read operation on a second recording disk which contains data bits representing a copy of said application program and a copy of said decoding rule and clock bits, the clock bits of the second recording disk being recorded according to a modified frequency modulation/frequency modulation (MFM/FM) recording format;

b) reading data bits and clock bits from said disk drive so that the original version of the application program and said decoding rule are installed in a host unit when said first recording disk is used or said copy of the application program and said copy of the decoding rule are installed in the host unit when said second recording disk is used;

c) decoding the clock bits according to the decoding rule installed by the step (b) when said first recording disk is used or decoding the clock bits according to the copy of the decoding rule installed by the step (b) when said second recording disk is used; and d) verifying the clock bits decoded by the step (c) and validating said original version of the application program if the clock bits are successfully decoded or invalidating said copy of the application program if the clock bits are not successfully decoded.

6. A method of protection from illegal copy of an original disk, comprising the steps of:

a) providing a read operation on a first recording disk which contains data bits representing an original version of an application program and a decoding rule, the application program of the first recording disk being recorded according to an application-specific encoding rule and the decoding rule of the first recording disk being recorded according to a group code recording (GCR) format, or a read operation on a second recording disk which contains data bits representing a copy of said application program and a copy of said decoding rule, both of said copies being recorded according to the GCR format;

b) reading data bits from said disk drive so that the original version of the application program and said decoding rule are installed in a host unit when said first recording disk is used or said copy of the application program and said copy of the decoding rule are installed in the host unit when said second recording disk is used;

c) decoding the data bits according to the decoding rule installed by the step (b) when said first recording disk is used or decoding the data bits according to the copy of the decoding rule installed by the step (b) when said second recording disk is used; and d) verifying the data bits decoded by the step (c) and validating said original version of the application program if the data bits are successfully decoded or invalidating said copy of the application program if the data bits are not successfully decoded.

7. A method for preventing unauthorized copying of a disk, comprising the steps of:

a) writing, on a first disk, an application program and a decoding program according to a generally established rule and clock bits according to an application-specific rule, said decoding program successfully decoding said clock bits only if the clock bits are recorded according to said application-specific rule;

b) writing, on a second disk, a copy of said application program, a copy of said decoding program and clock bits according to said generally established rule;

c) reading the decoding program and the clock bits from said first disk and performing the read decoding program on the read clock bits to allow said application program to be read from the first disk; and d) reading the decoding program and the clock bits from said second disk and performing the read decoding program on the read clock bits to prevent said copy of the application program from being read from the second disk.

8. A method as claimed in claim 7, wherein said generally established rule is MFM/FM (modified frequency modulation/frequency modulation) format.

9. A method for preventing unauthorized copying of a disk, comprising the steps of:

a) writing, on a first disk, an application program according to an application-specific rule and a decoding program according to a generally established rule, said decoding program successfully decoding said application program only if the application program is recorded according to said application-specific rule;

b) writing, on a second disk, a copy of the application program and a copy of the decoding program according to said generally established rule;

c) reading the decoding program and the application program from said first disk and performing the read decoding program on the read application program to validate the first disk; and d) reading the decoding program and the application program from said second disk and performing the read decoding program on the read application program to invalidate the second disk.

10. A method as claimed in claim 9, wherein said generally established rule is group code recording (GCR) format.

11. An apparatus adapted for operating on a first disk and a second disk, wherein said first disk contains an application program and a decoding program recorded according to a generally established rule and clock bits recorded according to an application-specific rule, said decoding program successfully decoding said clock bits only if the clock bits are recorded according to said application-specific rule, comprising:

means for writing a copy of said application program, a copy of said decoding program and clock bits according to said generally established rule on said second disk, the clock bits of the second disk being recorded according to a generally established rule;

means for reading the application program, the decoding program and the clock bits from said first disk, and reading the copy of the application program, the copy of the decoding program and the clock bits from said second disk; and means for performing the decoding program on the clock bits read from said first disk to allow the application program to be read from the first disk, and performing copying of the decoding program and the clock bits read from said second disk to prevent the copy of the application program from being read from the second disk.

12. An apparatus as claimed in claim 11, wherein said generally established rule is MFM/FM (modified frequency modulation/frequency modulation) format.

13. An apparatus adapted for operating on a first disk and second disk, wherein said first disk contains an application program recorded according to an application-specific rule and a decoding program recorded according to a generally established rule, said decoding program successfully decoding said application program only if the application program is recorded according to said application-specific rule, comprising:

means for writing, on a second disk, a copy of the application program and a copy of the decoding program according to said generally established rule;

means for reading the decoding program and the application program from said first disk and performing the read decoding program on the read application program to allow said application program to be read from the first disk; and means for reading the decoding program and the application program from said second disk and performing the read decoding program on the read application program to prevent said copy of the application program from being read from the second disk.

14. An apparatus as claimed in claim 13, wherein said generally established rule is group code recording (GCR) format.

* * * * *